UNITED STATES PATENT OFFICE.

JOHN H. CHEEVER, OF NEW YORK, N. Y.

PROCESS OF RECLAIMING RUBBER FROM OLD AND WASTE VULCANIZED RUBBER AND UTILIZING THE SAME IN MANUFACTURING RUBBER GOODS.

SPECIFICATION forming part of Letters Patent No. 233,600, dated October 26, 1880.

Application filed May 6, 1880. (Specimens.)

*To all whom it may concern:*

Be it known that I, JOHN H. CHEEVER, of the city, county, and State of New York, have invented a new and useful Improvement in the Process of Reclaiming Rubber From Old and Waste Vulcanized Rubber and Utilizing the Same in Manufacturing Rubber Goods, which invention is fully set forth in the following specification.

Heretofore many processes have been devised for utilizing old vulcanized rubber. It has been ground and mixed with raw rubber and sulphur, the mixture being subsequently subjected to vulcanizing temperature. The old rubber does not, however, enter into union with the new, but is retained by the latter in the mass, like other foreign substances used for filling or adulteration.

Old vulcanized rubber has also been softened by dry heat, hot water, and steam before being mixed with raw rubber and sulphur, but not with satisfactory results, the product being inferior.

The restoring of old rubber by boiling with solvents, generally oil of turpentine or naphtha, so as to form a solution adapted for use in various ways, has also been proposed.

In the present invention new rubber is used in connection with the old; but the latter is prepared in a new manner, being softened and impregnated with hydrocarbons by boiling in raw or crude petroleum. The raw petroleum does not all evaporate, as would be the case with naphtha or similar liquid, but only the light hydrocarbons are driven off, while the heavy hydrocarbons remain, increasing the weight of the mass and making a very valuable compound or mixture. This being mixed with new rubber and some sulphur vulcanizes to a very fair product, far superior to those containing old and new rubber in at all similar proportions prepared by known processes.

The following description will enable those skilled in the art to make and use my invention.

Take one hundred (100) pounds of old rubber, grind it in any ordinary or suitable way, and boil in an open kettle with a quick fire in two and one-half (2½) gallons of raw or crude petroleum for two (2) hours. The naphtha and light products will be driven off, but the other hydrocarbons remain in the rubber, which has become a somewhat soft and tacky or sticky mass. This is mixed with new rubber—say ten (10) pounds—and some sulphur, and vulcanized in any ordinary or suitable way.

The quantity of sulphur used will vary, of course, with the degree of hardness required in the product to be made, and can be readily determined by one skilled in the art to which the invention relates.

The proportion of new rubber can, of course, be increased, but the cost of the product would be enhanced, and it could be diminished below ten per cent. of the old rubber, but not, I believe, advantageously.

With the relative quantities of old rubber and petroleum indicated I have obtained good results; but I do not confine myself to these quantities, as they may be varied; neither do I confine myself to the use of an open kettle. A tight vessel heated by steam could be used, the temperature being raised to, say, 320° Fahrenheit; but I have not produced so good results as with the open kettle heated by fire.

Having thus fully described my said invention and the manner in which the same is or may be carried into effect, what I claim, and desire to secure by Letters Patent, is—

1. The method of treating old vulcanized rubber by boiling the same in raw petroleum, substantially as described.

2. The process of utilizing old rubber by boiling it with raw petroleum, mixing the resulting compound with new rubber and sulphur, and exposing the mixture to vulcanizing temperature.

3. Old vulcanized rubber softened and impregnated with hydrocarbons, as described.

4. The described vulcanized product, compounded of old rubber softened and impregnated with heavy hydrocarbons, new rubber, and sulphur.

In testimony whereof I have signed this specification in the presence of two subscribing witnesses.

JOHN H. CHEEVER.

Witnesses:
JAMES H. HUNTER,
TIMOTHY CAMUETT.